United States Patent [19]

Asami

[11] 4,331,068
[45] May 25, 1982

[54] CONTROL CIRCUIT FOR AUTOMATIC COOKING APPARATUS

[75] Inventor: Makoto Asami, Isesaki, Japan

[73] Assignee: Sankyo Electric Company Limited, Isesaki, Japan

[21] Appl. No.: 876,312

[22] Filed: Feb. 9, 1978

Related U.S. Application Data

[63] Continuation of Ser. No. 693,904, Jun. 8, 1976, abandoned.

[30] Foreign Application Priority Data

Jun. 10, 1975 [JP] Japan .................................. 50-69191

[51] Int. Cl.³ ............................................. A47J 27/00
[52] U.S. Cl. ......................................... 99/325; 99/357; 99/483; 222/129.4
[58] Field of Search ................. 99/325, 282, 330, 334, 99/357, 483; 141/104, 362; 194/2, 3, 5, 10, 13; 221/150 A, 150 R, 150 HC; 222/129.3, 129.4

[56] References Cited

U.S. PATENT DOCUMENTS

| | | | |
|---|---|---|---|
| 2,556,955 | 6/1951 | Ziegler | 99/334 |
| 2,990,973 | 7/1961 | Chazen | 99/483 |
| 3,160,255 | 12/1964 | Ferraro et al. | 99/483 |
| 3,425,339 | 2/1969 | Fleischman et al. | 99/357 |
| 3,428,218 | 2/1969 | Coja | 222/129.4 X |
| 3,435,753 | 4/1969 | Smith | 99/357 X |
| 3,465,668 | 9/1969 | Boscarino | 99/282 |
| 3,534,676 | 10/1970 | Rubino | 99/355 |
| 3,805,999 | 4/1974 | Syverson | 222/129.4 |
| 3,928,045 | 12/1975 | Tsunoda et al. | 99/330 |
| 3,932,723 | 1/1976 | Tamano et al. | 99/325 X |

*Primary Examiner*—Harvey C. Hornsby
*Assistant Examiner*—Arthur O. Henderson
*Attorney, Agent, or Firm*—Hopgood, Calimafde, Kalil, Blaustein & Judlowe

[57] ABSTRACT

A control circuit for an automatic cooking apparatus for cooking processed food contained in a cup, wherein desired ones of a plurality of hot water sources can be operated during a predetermined time by operating one of a group of cook selector controls. The control circuit comprises a plurality of timers each of which has a variable operating time period. Each timer is connected to a corresponding one of the cook selector controls and is started by the operation of one of those selector controls. A corresponding cooking device is connected to an output of each timer, a corresponding hot water source is connected, and to a power source through a common diode. The output of each timer connected to each selector control, which selects the operation of two or more hot water source, is connected through a diode to a cooking device to be operated at the time of the operation of the hot water source connected to the each timer.

13 Claims, 10 Drawing Figures

CONTROL CIRCUIT FOR AUTOMATIC COOKING APPARATUS

This is a continuation of Ser. No. 693,904, filed June 8, 1976, to be abandoned.

BACKGROUND OF THE INVENTION

This invention relates to control circuits for automatic cooking apparatus, and, in particular, to a control circuit for use in a cooking apparatus contained in a vending machine for dispensing foods contained in containers.

Processed and dried foodstuffs contained in containers such as cups have been produced and are being commercially sold which are readily cooked merely by pouring boiled water thereon, and if necessary, mixing the boiled water and the foodstuffs. For example, processed and dried noodles, soup, rice, stew and the like which are contained in cups have been commercially sold.

In selling cups containing such processed foodstuffs (referred to as "cup-foods" hereinafter), automatic vending machines are employed. But if the machine used provides only a vending function without any provision for feeding boiled water to the food, the purchaser of the cup-foods cannot eat the food instantly.

A vending machine has been provided for dispensing cup-foods, which is provided with a cooking apparatus so that a purchaser can instantly cook the obtained cup-food by the use of the cooking apparatus, and the food can then be eaten without further activity on the part of the purchaser.

The cooking apparatus in the conventional vending machine comprises a cooking chamber, a hot or boiled water feeding device, and other cooking devices arranged in the housing of the vending machine.

The purchaser puts an obtained cup-foods in the chamber, and then pushes a corresponding one of the cook selective button switches so that a single cup quantity of boiled water is fed and/or a corresponding cooking device or devices is operated.

In cooking various cup-foods in one cooking apparatus, it is sometimes required to discharge different quantities of boiled water or to operate other cooking device or devices besides the boiled water feeding device.

SUMMARY OF THE INVENTION

An object of this invention is to provide a control circuit for an automatic cooking apparatus wherein a desired cooking device or devices herein shown in the form of hot water sources and/or vibrating devices operated by manually operating a desired one of a plurality of cook-selecting buttons or controls.

Another object of this invention is to realize the above object with a simple circuit.

A further object of this invention is to provide a control circuit for cooking different cup-foods in a generally equal time period.

In an aspect of this invention, a plurality of timers are provided which are started by a plurality of selective button controls or switches, respectively. The operating time periods of all the timers are preset to be nearly equal. A plurality of boiled water feeding devices are respectively coupled with the timers to be operated by an output of the respective timers. The output of each timer is also coupled through a diode with a boiled water feeding device to be operated at the time of operation of another boiled water feeding device coupled with the timer so that desired quantities of boiled water may be fed during the time period.

In another aspect of this invention, a stirring device is coupled with an output of one of the timers and the output is also connected through a diode to a boiled water feeding device, so that boiled water feeding and stirring may be performed at one time by operating a selected button switch corresponding to the one timer.

Further objects, features and aspects of this invention will be clearly understood from the following description of embodiments of this invention referring to the annexed drawings.

DETAILED DESCRIPTION OF PREFERRED EMBODIMENTS

Figure 1:
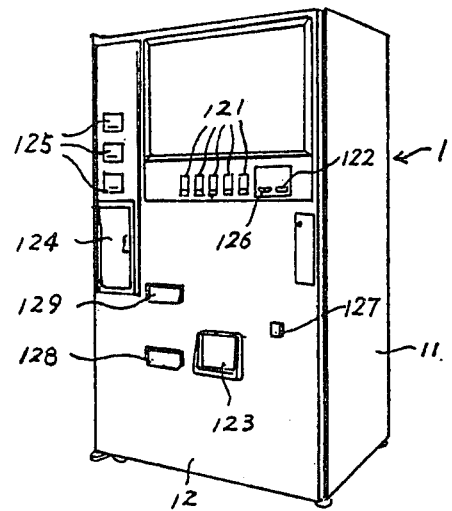
FIG. 1 is a perspective view of a vending machine with a cooking apparatus to which the present invention is applicable.

Referring to FIG. 1, a vending machine 1 comprises a housing 11 having a front door 12. The front door 12 is pivotally fixed to the housing 11 at one end and is locked to the housing at the opposite end, so that the door 12 may be selectively opened by releasing the lock.

Goods selective buttons 121 (five buttons are shown), a coin deposit opening 122, a good take-out opening 123, a door 124 for access to a cooking chamber, cook selective buttons 125 (three buttons are shown), a coin repaying lever 126, a coin repaying opening 127, a spoon take-out opening 128, and a fork take-out opening 129 are all provided on the front door 12.

The number of goods selective buttons 121, and the number of cook select buttons 125 may be varied accordingly to kinds of goods to be sold in the machine. The spoon take-out opening 128 and the fork take-out opening 129 are provided according to the kind of goods to be sold in the machine.

Figure 2:
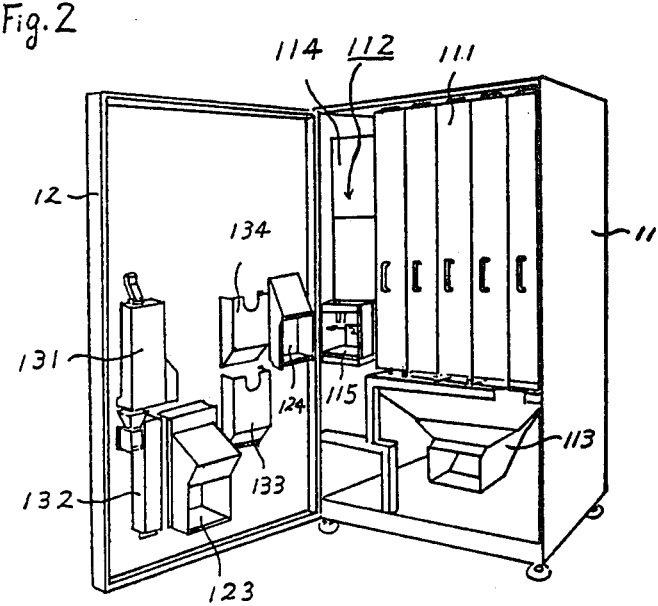
FIG. 2 is a perspective view of the vending machine in FIG. 1, with the door of a machine housing being open.

As shown in FIG. 2, shelf units 111 (five units are shown) for containing goods therein, a cooking apparatus 112 and a good discharge guide 113 are mounted within the housing 11. The cooking apparatus 112 comprises a hot or boiled water feeding device 114, a cooking chamber 115 and other mechanisms which are described hereinafter. On the rear side of the front door 12, a coin detecting mechanism 131, a coin containing box 132, a spoon containing box 133, and a fork containing box 134 are mounted.

When a purchaser deposits a coin or coins into the coin deposit opening 122 and, then pushes a good-select button 121, one good or a cup-food is discharged to the good discharge guide 113 from a corresponding shelf unit 111 by means of a control circuit and a good discharging mechanism (not shown). Thus, the purchaser can obtain a desired cup-food from the good take-out opening 123 which communicates with the good discharge guide 113.

Figure 3:
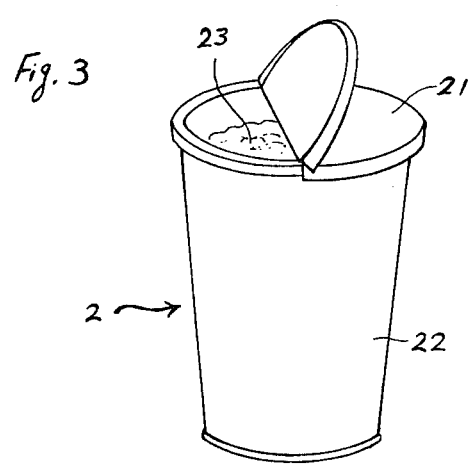
FIG. 3 is a perspective view of a cup-food which is sold in the vending machine in FIG. 1, with a tip cover being shown in a partially opened condition.

The purchaser takes off a cover 21 of the cup-food 2, as shown in FIG. 3, and, then, puts it in the cooking chamber 115 after opening the door 124. Then he pushes a corresponding cook-select button 125. Boiled water is fed into the cup 22 and poured on the food 23 in the cup 22 from the hot water feeding device 114. Thus, the purchaser can eat the cup-foods by the use of spoon or a fork which is obtained through a corresponding opening 128 or 129.

When various kinds of cup-foods are sold in the machine, which are different in the required quantities of boiled water, the cooking apparatus is so arranged that quantities of boiled water fed to different kinds of cup-foods are different from one another by operating corresponding cook-select button switches.

If a single discharge port of boiled water is provided to the cooking chamber, the time periods for feeding required quantities of boiled water are different between different kinds of cup-foods. That is, a considerable time is needed to feed boiled water to a cup-food requiring more quantities of boiled water. Moreover, certain kinds of cup-foods may not be properly cooked leading to irritation of the purchasers.

If a plurality of discharge ports of different sizes are provided such that each discharge port is exclusively used for different kinds of cup-foods, these disadvantages are overcome. But, when the kinds of cup-foods sold in the vending machine are changed, it is required to change the discharge ports. This too is very disadvantageous as requiring a shutdown of the machine and the need to maintain a supply of discharge ports of various sized openings, which is wasteful and costly.

According to this invention, a plurality of discharge ports of boiled water are provided in the cooking chamber and at least one of the ports is selectively used to feed boiled water into the cup-foods, depending on the required quantities of boiled water.

Figure 4:
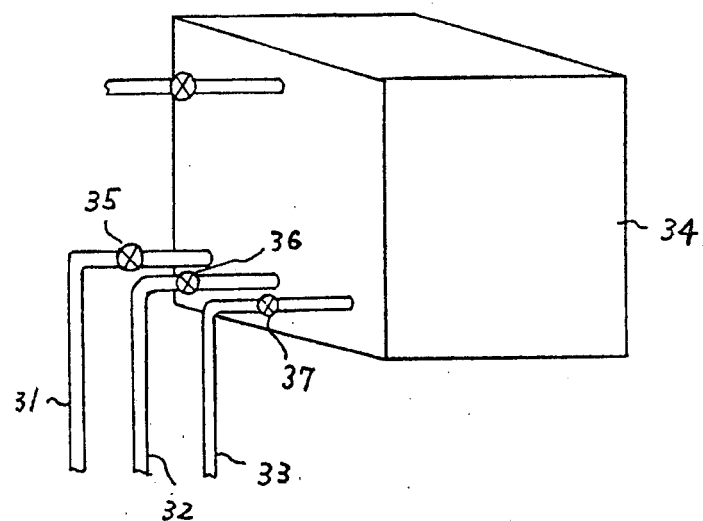
FIG. 4 is a schematic illustration of a boiled water feeding apparatus.

When, for example, three cook selector button switches are employed as shown in FIG. 1, the boiled water feeding apparatus comprises three outlet pipes 31, 32 and 33 connected to a boiled water tank 34, as shown in FIG. 4. The three outlet pipes are conducted to the cooking chamber through respective solenoid valves 35, 36 and 37 and terminate at the cooking chamber to provide discharge ports. The boiled water tank 34 is provided with a water inlet pipe and a heating device to supply water into the tank and to heat the water, respectively, as known in the prior art.

Figure 5:
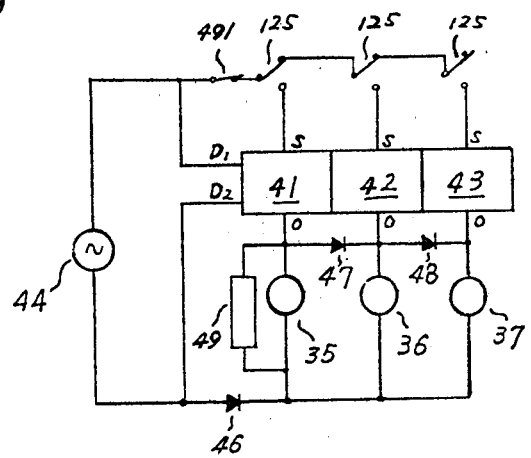
FIG. 5 is a schematic diagram of an embodiment of a control circuit of this invention.

A control circuit for controlling the boiled water feeding device in FIG. 4 comprises, as shown in FIG. 5, three timers 41, 42 and 43. Each timer is respectively connected to a power source 44 at the driving terminals $D_1$ and $D_2$, to the power source through each cook selector button switch 125 at the starting signal input terminal S, and to the solenoid valves (35, 36, 37) at the output terminal O.

Each timer operates during a preset time period to provide an output after receiving the starting signal. The operating time period of each timer is variable and adjustable.

The solenoid valves 35, 36 and 37 are connected to the power source 44 through a common diode 46 so that each solenoid valve is operated to discharge boiled water during the operation of a corresponding one of the timers. The output terminals O of timers 41, 42 and 43 are connected by two diodes 47 and 48 to one another as shown in FIG. 5.

According to this arrangement, two solenoid valves 35 and 36 are operated during a time period when the timer 42 is in operation, so that feeding of boiled water is performed from two ports. On the other hand, when another timer 43 is operated, all three solenoid valves 35, 36 and 37 are operated so that boiled water is discharged from three ports.

Thus, in the embodiment of FIGS. 4 and 5, three different feeding quantities of boiled water can be selected by the three cook selector button switches 125.

Each feeding quantity of boiled water to be selected by the operation of each cook selector button switch can be varied by changing or adjusting the operating time period of each corresponding timer. Accordingly, if the goods to be sold or dispensed from the vending machine are changed, new feeding quantities of boiled water which are required to cook the new goods may be readily established.

If the three ports of pipes 31, 32 and 33 are of different sizes, it is also possible to change the feeding quantities of boiled water to be selected by the cook selector button switches by exchanging the connection of solenoid valves 35, 36 and 37 with timers 41, 42 and 43.

In the circuit of FIG. 5, a relay 49 is included across solenoid valve 35 for resetting a starting signal which is provided to the timers by operating the cook selector button switches. A break contact 491 of relay 49 is connected between the power source 44 and the cook selector button switches 125.

Once any timer is started by operating a corresponding cook selector button switch, the relay 49 is maintained in operation during that operation of the timer. Accordingly, the break contact 491 breaks between the power source 44 and each cook selector button switch 125. Therefore, during a time period when any one of the timers is in operation the other timers do not operate even if the corresponding cook selector button switches are operated.

Figure 6:
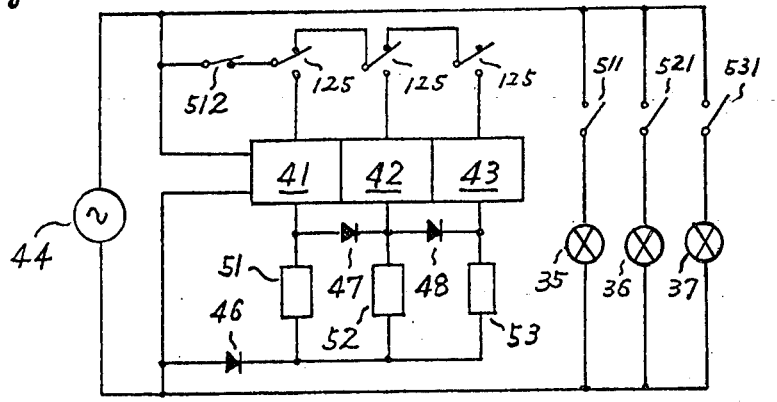
FIG. 6 is a schematic diagram of another embodiment of a control circuit.

In the control circuit of FIG. 6, which is a modification of the circuit of FIG. 5 solenoid valves 35, 36 and 37 are not directly connected to the outputs of timers but are connected to the power source 44, and relays 51, 52 and 53 are respectively connected to the outputs of timers 41, 42 and 43. The make contacts 511, 521 and 531 of relays 51, 52, and 53 respectively are connected between the power source 44 and solenoid valves 35, 36 and 37, respectively.

It will be understood that the modified control circuit of FIG. 6 operates similarly as the control circuit in FIG. 5.

The relay 51 not only controls the operation of the solenoid valve 35 but also serves as the relay 49 in FIG. 5. Namely, the relay 51 also has a break contact 512 which is connected, similarly as the break contact 491 in FIG. 5, between the power source 44 and each cook selector button switch 125.

In certain cup-foods, it is required to stir foods in the cup in addition to feeding hot water in order to cook the cup-foods.

In a cooking apparatus of a vending machine for selling such cup-foods that require stirring, a stirring device is provided that is driven by the operation of a corresponding cook selector button switch. As a stirring device, a device for vibrating the cup is employed which comprises a vibratory table and a driver for vibratorily moving the table.

Figure 7:
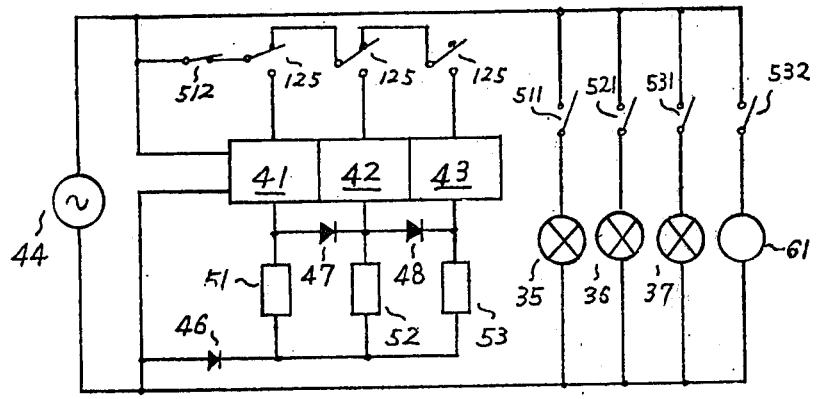
FIG. 7 is a schematic diagram of another embodiment of a control circuit of this invention.

The control circuit for a cooking apparatus of FIG. 7, which includes such a vibrating device, is similar to the circuit shown in FIG. 6, except that the driver 61 of the vibrating device is connected to the power source 44 through another make contact 532. Similar circuit components are indicated by the same reference number as in the circuit of FIG. 6.

In the control circuit of FIG. 7, the vibrating device is driven only when one timer 43 is operated. The vibrating device is driven. As will be noted, the vibrating device may be readily made to be controlled by another timer or timers, such as timers 41 and 42, by replacing the make contact 531 of the relay 53 by a make contact and/or by making contacts of the other timer or timers.

From the foregoing, it will be appreciated that it is possible, according to this invention, to establish various cooking conditions without the replacement or addition of previously assembled ports.

Figure 8:
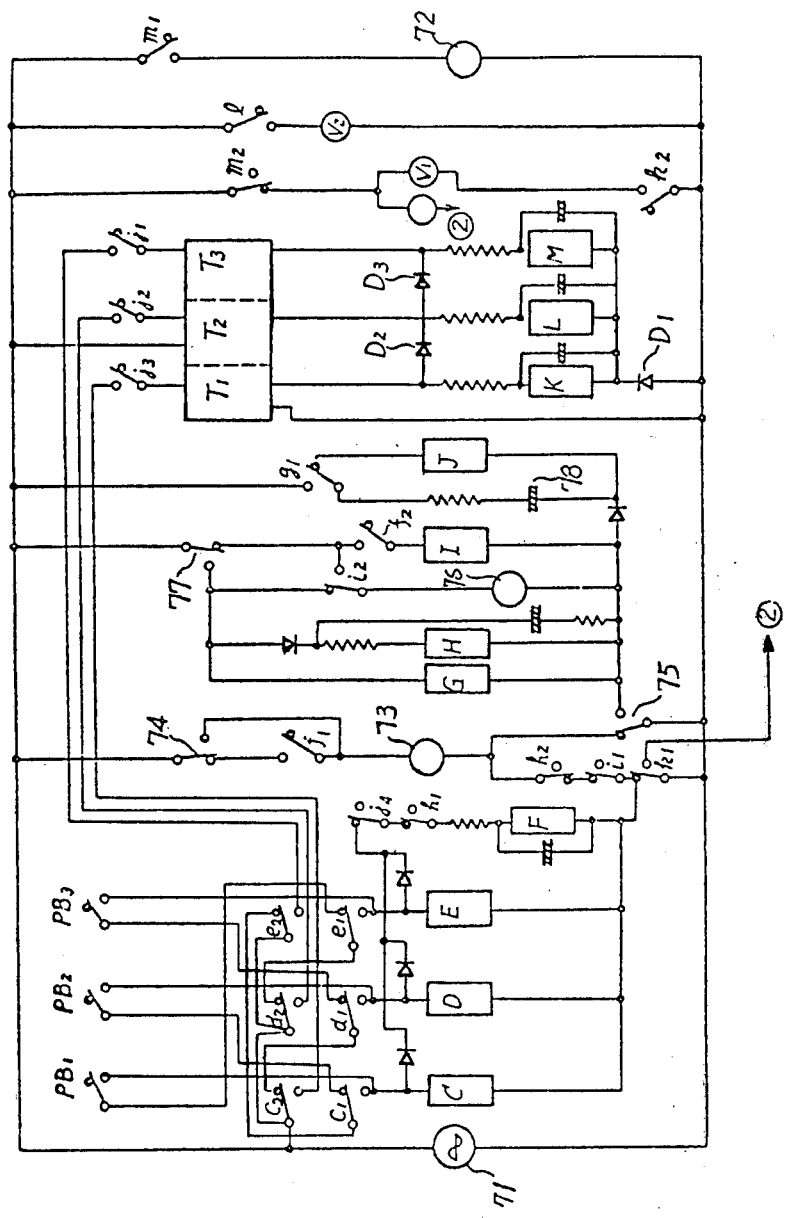
FIG. 8 is a schematic diagram of a circuit for controlling cooking apparatus which includes motion devices besides cooking devices.

FIG. 8 shows a practical embodiment of a control circuit of a cooking apparatus which further includes motion devices such as a device for perforating a top cover of the cup for permitting boiled water to be poured into the cup and a device for transferring the cup to a cooking position, in addition to the cooking devices which, in this embodiment, include the boiled water feeding devices and a vibrating device.

Referring to FIG. 8, three timers $T_1$, $T_2$ and $T_3$ are provided according to three cook selector button switches $PB_1$, $PB_2$ and $PB_3$. Relays K, L and M are respectively connected to the output terminals of timers $T_1$, $T_2$ and $T_3$, and a common diode $D_1$ is connected between relays K, L and M and a power source 71, similarly as in the circuit of FIG. 6. Diodes $D_2$ and $D_3$ are also connected between the outputs of timers $T_1$ and $T_2$ and between the outputs of timers $T_2$ and $T_3$, respectively.

Two solenoid valves $V_1$ and $V_2$ and a motor 72 for a vibrating device are connected to the power source 71 in parallel with one another.

A make contact $m_1$ of the relay M is connected in series with the motor 72, and a make contact l of the relay L is connected in series with the solenoid valve $V_2$.

A break contact $m_2$ of the relay M and a make contact $k_2$ of the relay K are connected in series with the solenoid valve $v_1$.

When timer $T_1$ is in operation, only the solenoid valve $V_1$ is operated. When timer $T_2$ is in operation, solenoid valves $V_1$ and $V_2$ are operated to discharge boiled water. When timer $T_3$ is in operation, the solenoid valve $V_2$ and the motor 72 are operated but the solenoid valve $V_1$ is not operated by the break contact $m_2$ of the relay M.

Relays C, D, and F are provided corresponding to cook selector button switches $PB_1$, $PB_2$ and $PB_3$, respectively, which detect which of the button switches is operated first. The relay C has two operating contacts $c_1$ and $c_2$, and is operated by the operation of the button switch $PB_1$ to maintain the operating condition of the relay C through its operating contact $c_1$ and to prevent the other relays from operation by the operation of corresponding button switches. Another relay D has two operating contacts $d_1$ and $d_2$ and operates similarly as the relay C. Similarly, the relay E has two operating contacts $e_1$ and $e_2$.

A relay F, which has two make contacts $f_1$ and $f_2$, is provided for detecting the operation of either one of the three relays C, D and E.

These relays C, D, E and F are connected to the power source 71 through a break contact $k_1$ of the relay K, so that these relays are reset when either one of timers $T_1$, $T_2$ and $T_3$ is operated.

A motor 73 of the transferring device is coupled with the power source 71 through the make contact $f_1$ of the relay F and a cam switch 74 operated by the motor 73.

The cam switch 74 is at the condition shown when the transferring device is in the rest position and is maintained at its alternate condition during a period from the start of the motor 73 to the restoration of the transferring device to its rest position.

Switch 75 is a microswitch for detecting that the cup is transferred to the cooking position by the operation of the motor 73.

A relay I is provided for detecting the operation of the switch 74 to start another motor 76 by its operating contact $i_2$ and to stop the operation of motor 73 by its break contact $i_1$. The motor 76 is a driving source of the perforating device.

Switch 77 is a cam switch operated by the motor 76 and is at the condition shown when the perforating device is at its rest position. The switch 77 is moved to its alternate condition when the motor 76 is started and is maintained at the alternate condition until the perforating device is restored to its rest position after perforating the cup.

A relay H is operated by the exchange of the cam switch 77 to reset relay F by a break contact $h_1$ and to maintain the stop of motor 73 by a break contact $h_2$.

A relay G is also operated by the change of condition of the cam switch 77 to charge a capacitor 78 through its operating contact $g_1$.

A relay J is operated by the discharge current of the capacitor 78 through contact $g_1$ of the relay G to operate either one of timers $T_1$, $T_2$ and $T_3$ through its make contacts $j_1$, $j_2$ and $j_3$ and to maintain relay F in a reset condition through its break contact $j_4$.

When either one of the cook selector button switches, for example, $PB_1$, is operated, relay C operates and maintains its operating condition through its operating contact $c_1$. The other relays D and E are removed from the connection with the power source 71 by the operating contacts $C_1$ and $C_2$.

Relay F is operated at the same time when relay C is operated and is maintained in operating condition through the operating contact $C_1$.

Then, the motor 73 starts by make contact $f_1$ of the relay F to drive the transferring device and maintains its operation by exchange of the cam switch 74.

When the cup-food is transferred to the cooking position, the microswitch 75 is operated to operate the relay I through a make contact $f_2$ of the relay F. As a result, the motor 73 is stopped by break contact $i_1$ of the relay I, and, on the other hand, another motor 76 starts to drive the perforating device.

The operation of the motor 76 is maintained by the cam switch 77 until the perforating device is restored to its rest position after the completion of perforation.

During the perforating operation, the motor 73 is maintained in a stop condition by break contact $h_2$ of the relay H, and the capacitor 78 is charged through operating contact $g_1$ of the relay G.

When the perforating device is restored to its rest position, the cam switch 77 restores so that the motor 76 stops. At the same time, relays G and H restore so that the relay J operates by the discharge current of the capacitor 78 to start the timer $T_1$ through a make contact $j_1$ of the relay J.

Timers $T_2$ and $T_3$ are not started because no power is given by operating contacts $d_2$ and $e_2$ of relays D and E. Timer $T_1$ operates during a preset time period to operate to relay K. Therefore, the solenoid valve $V_1$ is operated and a predetermined quantity of boiled water is poured into the cup-food. During the operation of the timer $T_1$, the motor 73 is also stopped by a break contact $k_1$ of the relay K. When the relay K is operated, relays C and F are restored by a break contact $k_1$ of the relay K. When the timer $T_1$ stops the operation, the motor 73 again operates because relays H and I are already restored and the relay K is restored.

When the transferring device restores to its rest position, the cam switch 74 is restored to its original position so that the motor 73 is stopped. Thus the control circuit restores to its original condition.

When either one of the other button switches $PB_2$ and $PB_3$ is operated, the control circuit operates similarly, but the timer to be started is different. Namely, when button switch $PB_2$ is operated, only one timer $T_2$ is operated so that solenoid valves $V_1$ and $V_2$ are operated. On the other hand, when the other button switch $PB_3$ is operated, the other relay $T_3$ is operated so that one solenoid valve $V_2$ and the motor 72 for the vibrating device are operated.

In the embodiment of FIG. 8, the purchaser is not required to open the cover of the obtained cup-food before putting it in the cooking chamber, because the perforating device is provided to the cooking apparatus.

The timer which is used in the above described embodiments may be of the electronic type in which a charging and discharging circuit of a capacitor is employed, or of the mechanical type.

Figure 9:
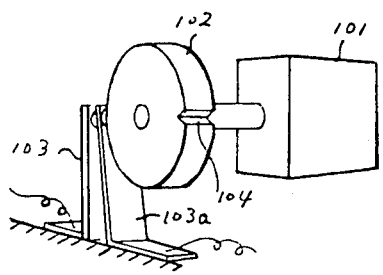
FIG. 9 is a schematic illustration of a timer that may be used in this invention.

FIG. 9 shows an example of a timer that may be used in the control circuit of the invention which comprises an electric motor 101, a cam 102 which is rotated by the motor 101, and a switch contact 103 the on-off operation of which is controlled by the cam 102.

A contact plate 103a of the switch contact 103 follows the cam 102, so that the switch contact 103 is turned off at a time when the contact plate 103a engages with a depression 104 of the cam 103. When the contact plate 103a engages with the other cam surface, the switch contact 103 is conducted.

The contact plate 103a engages with the depression 104 when the timer is not operated. Once the timer is started by energizing the motor 101, the switch contact 103 is maintained on during a time period until a complete revolution of the cam is performed, and, thereafter, is turned off.

Accordingly, the operating time period of the timer is adjustable by adjusting the rotating rate of the cam 102.

Figure 9A:
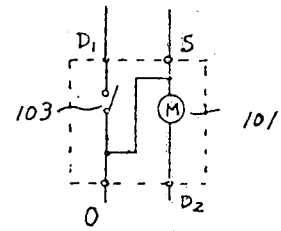
FIG. 9a is a schematic circuit diagram of the timer in FIG. 9.

FIG. 9a is a circuit diagram of the timer in FIG. 9.

In the above described embodiments, this invention is described in connection with an application in which three cook selector button switches are used, but this invention is also applicable to the use of more cook selector buttons by minor modifications of circuits and by the addition of timers and other ports. Furthermore, it will be understood that this invention will be applicable to automatic cooking apparatus for cooking various foods besides cup-foods.

What is claimed is:

1. In an apparatus for cooking processed foods which includes a plurality of manually operated cook selectors corresponding to a plurality of different cooking conditions requiring different amounts of boiled water, and a plurality of means for discharging a quantity of boiled water, a control circuit comprising a plurality of timer means respectively coupled to said cook selectors and started by the operation of a corresponding one of said cook selectors, a plurality of means for operating said boiled water discharging means respectively coupled to the outputs of said timer means, and first diode means connected between the output of a predetermined first one of said timer means and the output of a predetermined second one of said timer means and coupling, in addition to a first one of said operating means coupled with said first one of said timer means, a second one of said operating means coupled with said second one of said timer means with the output of said first one of said timer means so that a first one of said boiled water discharging means corresponding to said first one of said operating means as well as a second one of said boiled water discharging means corresponding to said second one of said operating means are both operated at a time when said first one of said timer means is started by a corresponding one of said cook selectors to discharge a predetermined quantity of boiling water within a specified time period.

2. The control circuit as claimed in claim 1, further comprising relay means respectively connected between the outputs of said timer means and the power source through a common second diode means, said operating means being respectively connected to the power source through the operating contacts of said relay means, said first diode means connecting one of said relay means connected to the output of said second one of said timer means with the output of said first one of said timer means so that said relay means connected to the outputs of said first and second timer means respectively are both operated at a time when said first timer means is started by a corresponding cook selector.

3. The control circuit as claimed in claim 1, in which said operating means comprises solenoid valves for controlling the flow of boiled water from said water discharging means.

4. The control circuit as claimed in claim 2, in which said operating means comprises solenoid valves for controlling the flow of water from said boiled water discharging means.

5. The control circuit as claimed in claim 1, further comprising means for vibrating the food to which boiled water has been added.

6. The control circuit of claim 5, in which the operating means associated with said boiled water discharging means comprises solenoid valves, and the operating means associated with said vibrating means comprises an electric motor means.

7. The control circuit of claim 2, in which said relay means further comprises a break contact in series connection with said cook selector switches.

8. The control circuit of claim 1, in which the operating period of each of said timer means is adjustable.

9. A control apparatus for a food-dispensing apparatus in which one of a plurality of processed foods is dispensed after being mixed with heated water upon the operation of a corresponding one of a plurality of food-select means, different ones of said processed foods requiring a different quantity of boiling water, said apparatus comprising a corresponding plurality of timer means operatively respectively connected to said food-select means, a corresponding plurality of hot water discharging means, a plurality of operating means coupled with the outputs of said timer means for respectively controlling the operation of said hot water discharging means, and diode means coupling one of said operating means corresponding to one of said timer means to the output of another one of said timer means so that said one of said operating means is operated at the operation of said one timer means and is also operated at the operation of said another timer means at one time with another one of said operating means corresponding to said another timer means, thereby to cause the operation of a predetermined number of said hot water discharging means and thereby provide a desired amount of heated water to the selected food.

10. The apparatus of claim 9, in which said operating means includes a plurality of valves respectively coupled to the outputs of said timer means.

11. The apparatus of claim 10, in which said operating means further comprise a plurality of relays each having a contact respectively effective when actuated to respectively actuate said plurality of valves.

12. The apparatus of claim 11, further including an additional relay contact in series connection with said food-select means.

13. The apparatus of claim 12, further comprising means for actuating a vibrator for the combined heated water and food, and an additional relay contact associated with one of said relays and effective when actuated, to actuate said vibrator.

* * * * *

UNITED STATES PATENT AND TRADEMARK OFFICE
CERTIFICATE OF CORRECTION

PATENT NO. : 4,331,068
DATED : May 25, 1982
INVENTOR(S) : Makoto Asami

It is certified that error appears in the above-identified patent and that said Letters Patent are hereby corrected as shown below:

On the title page, in the abstract:

Line 11, delete "a corresponding hot water";

Line 12, delete "source is connected,".

Signed and Sealed this

Tenth Day of August 1982

[SEAL]

Attest:

GERALD J. MOSSINGHOFF

*Attesting Officer*     *Commissioner of Patents and Trademarks*